(12) United States Patent
Saenger Nayver (10) Patent No.: US 12,547,038 B2
(45) Date of Patent: Feb. 10, 2026

(54) ELECTRO-OPTIC ELEMENT ELECTRODES

(71) Applicant: GENTEX CORPORATION, Zeeland, MI (US)

(72) Inventor: Mario F. Saenger Nayver, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 627 days.

(21) Appl. No.: 17/932,703

(22) Filed: Sep. 16, 2022

(65) Prior Publication Data

US 2023/0082112 A1 Mar. 16, 2023

Related U.S. Application Data

(60) Provisional application No. 63/244,799, filed on Sep. 16, 2021.

(51) Int. Cl.
*G02B 26/00* (2006.01)
*F21V 14/00* (2018.01)
(Continued)

(52) U.S. Cl.
CPC ............ *G02F 1/1533* (2013.01); *G02F 1/155* (2013.01)

(58) Field of Classification Search
CPC ...... G02F 1/1523; G02F 1/1533; G02F 1/155; G02F 1/0102; G02F 1/163; G02F 1/0136; G09G 3/16
(Continued)

(56) References Cited

U.S. PATENT DOCUMENTS

| 10,481,460 | B2 | 11/2019 | Stephenson | |
|---|---|---|---|---|
| 2002/0140643 | A1* | 10/2002 | Sato | H10K 50/84 345/76 |

(Continued)

FOREIGN PATENT DOCUMENTS

KR 102056095 B1 12/2019

OTHER PUBLICATIONS

International Search Report dated Jan. 10, 2023, for corresponding PCT application No. PCT/US2022/076518, 3 pages.
(Continued)

*Primary Examiner* — Dawayne Pinkney
(74) *Attorney, Agent, or Firm* — Price Heneveld LLP; Brian James Brewer (57) ABSTRACT

A device is disclosed that comprises first and second substrates, first and second electrodes, and an electro-optic medium. The first and second substrates may be disposed in a substantially spaced apart manner. Each of the first and second electrodes are associated with one of the first and second substrates and the electro-optic medium is disposed therebetween. Further, at least one of the first and second electrodes comprises a first conductive layer, a second conductive layer, and an insulating layer. The first conductive layer may be distributed across a plurality of points. The second conductive layer may be disposed between the first conductive layer and the electro-optic medium. The insulating layer may be disposed between the first and second conductive layers and patterned with a plurality of holes aligned with the plurality of points. The holes may be operable to allow electrical communication between the first and second conductive layers.

17 Claims, 10 Drawing Sheets

(51) Int. Cl.
  *G02F 1/01*   (2006.01)
  *G02F 1/15*   (2019.01)
  *G02F 1/153*  (2006.01)
  *G02F 1/155*  (2006.01)
  *G09G 3/19*   (2006.01)

(58) Field of Classification Search
  USPC ........ 359/245–247, 242, 281, 265–275, 277;
  345/49, 105; 250/70; 348/814, 817;
  438/929; 349/182–186
  See application file for complete search history.

(56)             References Cited

U.S. PATENT DOCUMENTS

| | | | |
|---|---|---|---|
| 2002/0158835 | A1* | 10/2002 | Kobayashi ........... H10K 50/818 |
| | | | 345/100 |
| 2010/0319759 | A1* | 12/2010 | Fisher .................. H10F 77/123 |
| | | | 977/762 |
| 2013/0168661 | A1  | 7/2013  | Min et al. |
| 2017/0115521 | A1  | 4/2017  | McCormick et al. |
| 2017/0336693 | A1* | 11/2017 | Stephenson ........... G02F 1/1533 |
| 2019/0361309 | A1  | 11/2019 | Bergh et al. |
| 2020/0233276 | A1  | 7/2020  | Gao et al. |
| 2022/0115279 | A1* | 4/2022  | Tan ........................ H10D 86/40 |

OTHER PUBLICATIONS

Written Opinion dated Jan. 10, 2023, for corresponding PCT application No. PCT/US 2022/076518, 4 pages.

* cited by examiner

ELECTRO-OPTIC ELEMENT ELECTRODES

This application claims priority under 35 U.S.C. § 119(e) to U.S. Provisional Application No. 63/244,799 filed on Sep. 16, 2021, entitled "ELECTRO-OPTIC ELEMENT ELECTRODES," the disclosure of which is hereby incorporated by reference in its entirety.

FIELD OF INVENTION

Field of Invention

The present invention relates in general to electro-optic elements and, more particularly, to electrodes of electro-optic elements.

Background

Electro-optic elements are increasingly common in various devices, such as dimmable windows or rearview assemblies. These electro-optic elements rely on activation of an electro-optic medium disposed between two electrodes. The electro-optic medium may be variably activated based, at least in part, on the electrical potential to which it is exposed. The electrodes of these electro-optic elements are commonly conductive layers disposed across a viewing region of the device. However, these electrodes have sheet resistance, which increases across the respective electrode as the distance to an electrical contact or bus increases. This increase in sheet resistance may case a reduction in the electrical potential. This may be referred to as a potential drop. Therefore, the electrical potential applied by the electrode may not be uniform there across. This lack of uniformity may result in inconsistent activation of the electro-optic medium across the element, which may be visually apparent. Accordingly, there is a need for electro-optic elements with improved electrodes.

DETAILED DESCRIPTION

For the purposes of description herein, specific devices and processes illustrated in the attached drawings and described in this disclosure are simply exemplary embodiments of the inventive concepts defined in the appended claims. Hence, specific characteristics relating the embodiments disclosed herein are not to be considered as limiting, unless the claims expressly state otherwise.

Figure 1:
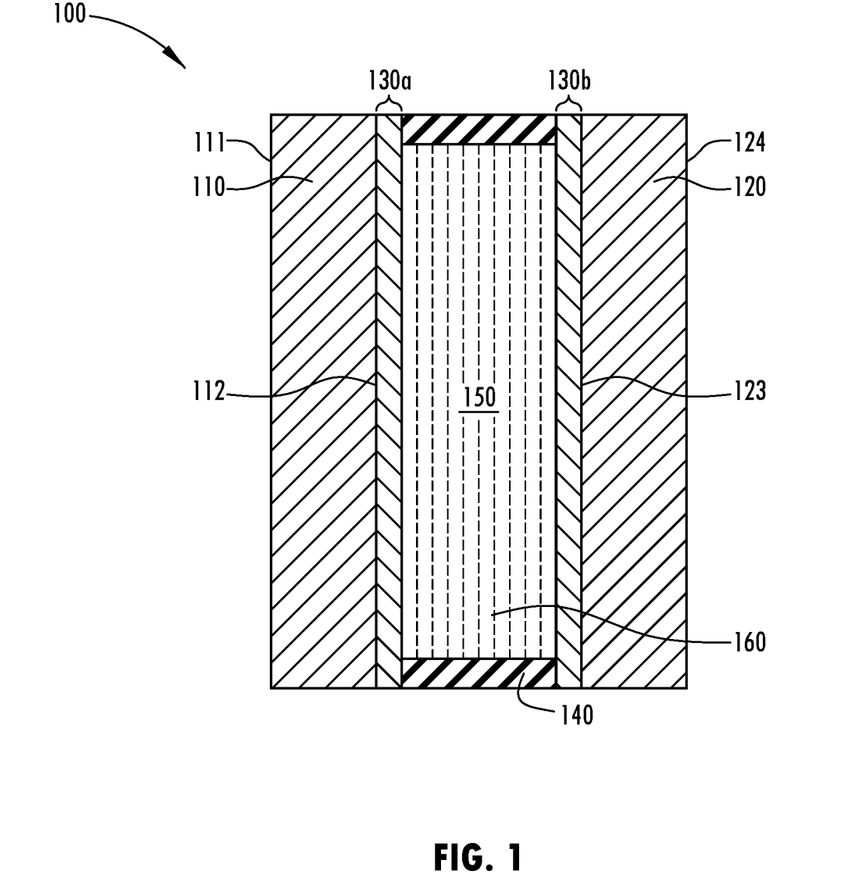
FIG. 1 is a cross-sectional schematic representation of an electro-optic element.

The present disclosure is directed to an electro-optic element with improved electrodes. Accordingly, FIG. 1 illustrates a cross-sectional representation of an embodiment of an electro-optic element 100. Electro-optic element 100 may comprise a first substrate 110, a second substrate 120, at least two electrodes 130, a seal 140, a chamber 150, an electro-optic medium 160. Further, electro-optic element 100 may be operable between a substantially activated state and a substantially un-activated state. Operation between such states may correspond to a variable transmissivity of electro-optic element 100. Electro-optic element 100, for example, may be a window, a sunroof, a rearview mirror assembly, a light filter, or a sensor concealment device. In some embodiments, electro-optic element 100 may comprise a plurality of zones 101. Each zone may serve to segment electro-optic element 100 into multiple portions. Further, each zone 101 may be independently activated. Accordingly, electro-optic element 100 may be substantially selectively activated in one or more zone 101.

First substrate 110 may be substantially transparent in the visible and/or infrared regions of the electromagnetic spectrum. Further, first substrate 110 may have a first surface 111 and a second surface 112. First surface 111 and second surface 112 may be disposed opposite one another with second surface 112 disposed in a first direction relative first surface 110. The first direction may be defined as a direction substantially orthogonal first surface 111. Further, the one or more zones 101 may be defined by conceptual barriers extending substantially perpendicular to the first and second surfaces 111, 112. Additionally, first substrate 110, for example, may be fabricated from any of a number of materials, such as alumino-silicate glass, such as Falcon commercially available from AGC; boroaluminosilicate ("BAS") glass; polycarbonate, such as ProLens® polycarbonate, commercially available from Professional Plastics, which may be hard coated; polyethylene terephthalate, such as but not limited to Spallshield® CPET available from Kuraray®; soda lime glass, such as ultra-clear soda lime glass; float glass; natural and synthetic polymeric resins and plastics, such as polyethylene (e.g., low and/or high density), polyethylene terephthalate (PET), polyethylene naphthalate (PEN), polycarbonate (PC), polysulfone, acrylic polymers (e.g., poly(methyl methacrylate) (PMMA)), polymethacrylates, polyimides, polyamides (e.g., a cycloaliphatic diamine dodecanedioic acid polymer (i.e., Trogamid® CX7323)), epoxies, cyclic olefin polymers (COP) (e.g., Zeonor 1420R), cyclic olefin copolymers (COC) (e.g., Topas 6013S-04 or Mitsui Apel), polymethylpentene, cellulose ester based plastics (e.g., cellulose triacetate), transparent fluoropolymer, polyacrylonitrile; and/or combinations thereof. While particular substrate materials are disclosed, for illustrative purposes only, numerous other substrate materials are likewise suitable—so long as the materials are at least substantially transparent and exhibit appropriate physical properties such as strength and tolerance to conditions of the device's environment, such as ultra-violet light exposure from the sun, humidity, and temperature extremes.

Similarly, second substrate 120 may have a third surface 123 and a fourth surface 124. Third surface 123 and fourth surface 124 may be disposed opposite one another with fourth surface 124 disposed in the first direction relative third surface 123. Additionally, second substrate 120 may be disposed in the first direction in a substantially parallel and spaced apart relationship relative first substate 110. Thus, third surface 123 may face second surface 112. In some embodiments, second substrate 120 may be substantially transparent in the visible and/or infrared regions. Accordingly, second substrate 120 may be comprised of the same or similar materials suitable for first substate 110. In other embodiments, such as for a rearview mirror assembly, substantial transparency may not be necessary. In such an embodiment, second substrate 120 may also be selected from substantially opaque and/or reflective materials.

The at least two electrodes 130 may comprise a first electrode 130a and a second electrode 130b. First electrode 130a, may be associated with second surface 112 of first substate 110. Accordingly, first electrode 130a may be disposed on second surface 112. Similarly, second electrode 130b may be associated with third surface 123 of second substate 120. Accordingly, second electrode 130b may be disposed on third surface 123. Further, each of the electrodes 130 may generally be in electrical communication with electro-optic medium 160. In some embodiments, one or more of the electrodes 130 may be substantially transparent, reflective, and/or transflective in the visible and/or infrared regions of the electromagnetic spectrum. Additionally, in some embodiments, one or more of the electrodes 130 may be divided by the zones 101 of electro-optic element 100.

Figure 2A:
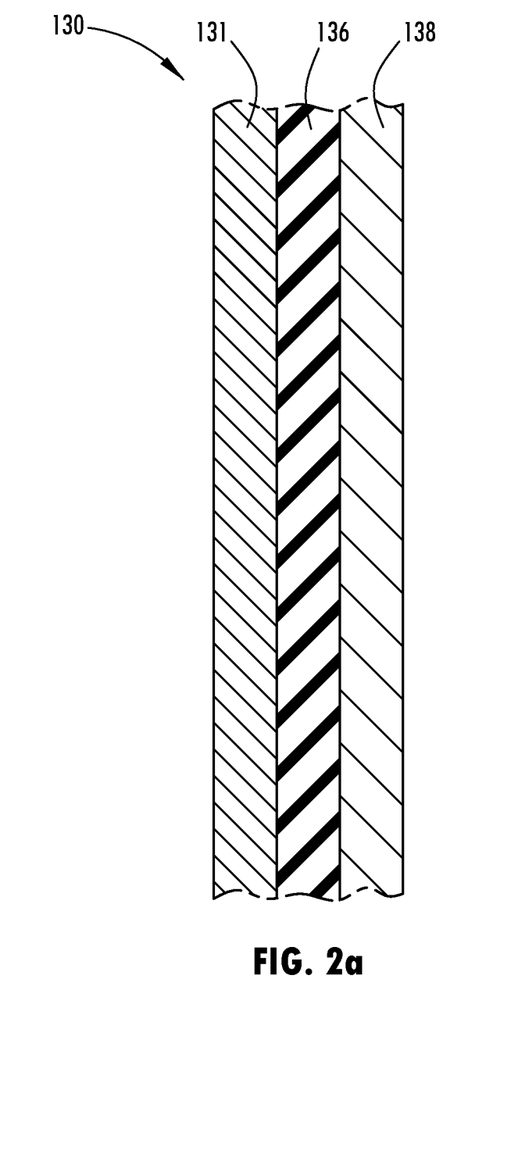
FIG. 2a is a cross-sectional schematic representation of an embodiment of an electrode of an electro-optic element.
Figure 2B:
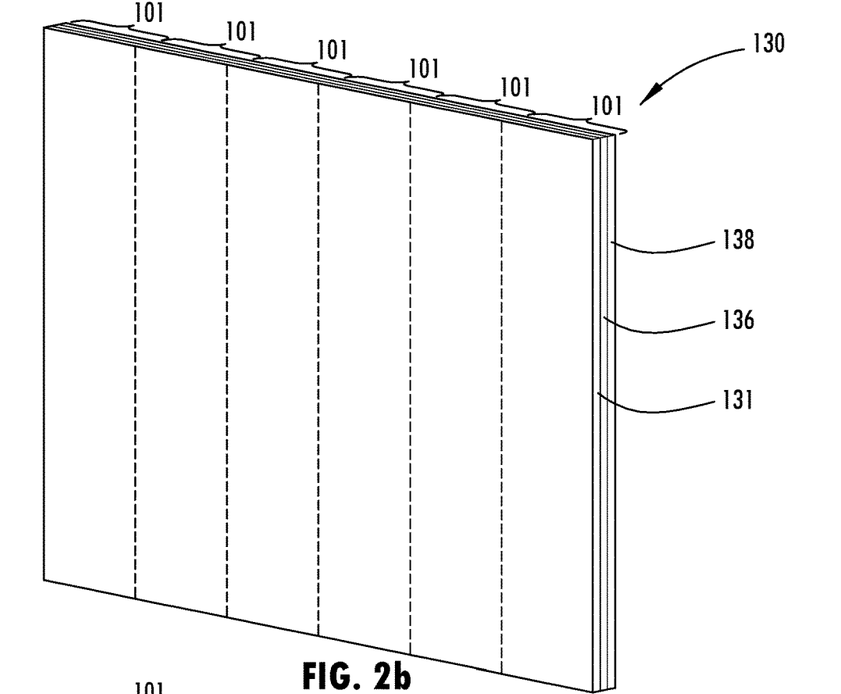
FIG. 2b is a perspective view of an embodiment of an electrode of an electro-optic element.
Figure 2C:
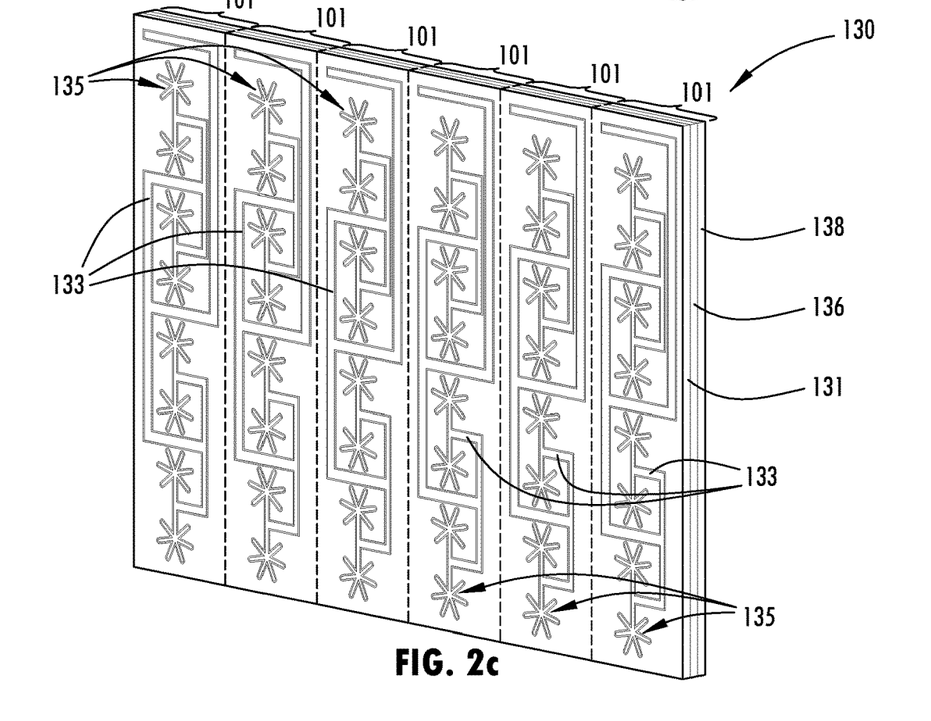
FIG. 2c is a perspective view of an embodiment of an electrode of an electro-optic element.
Figure 2D:
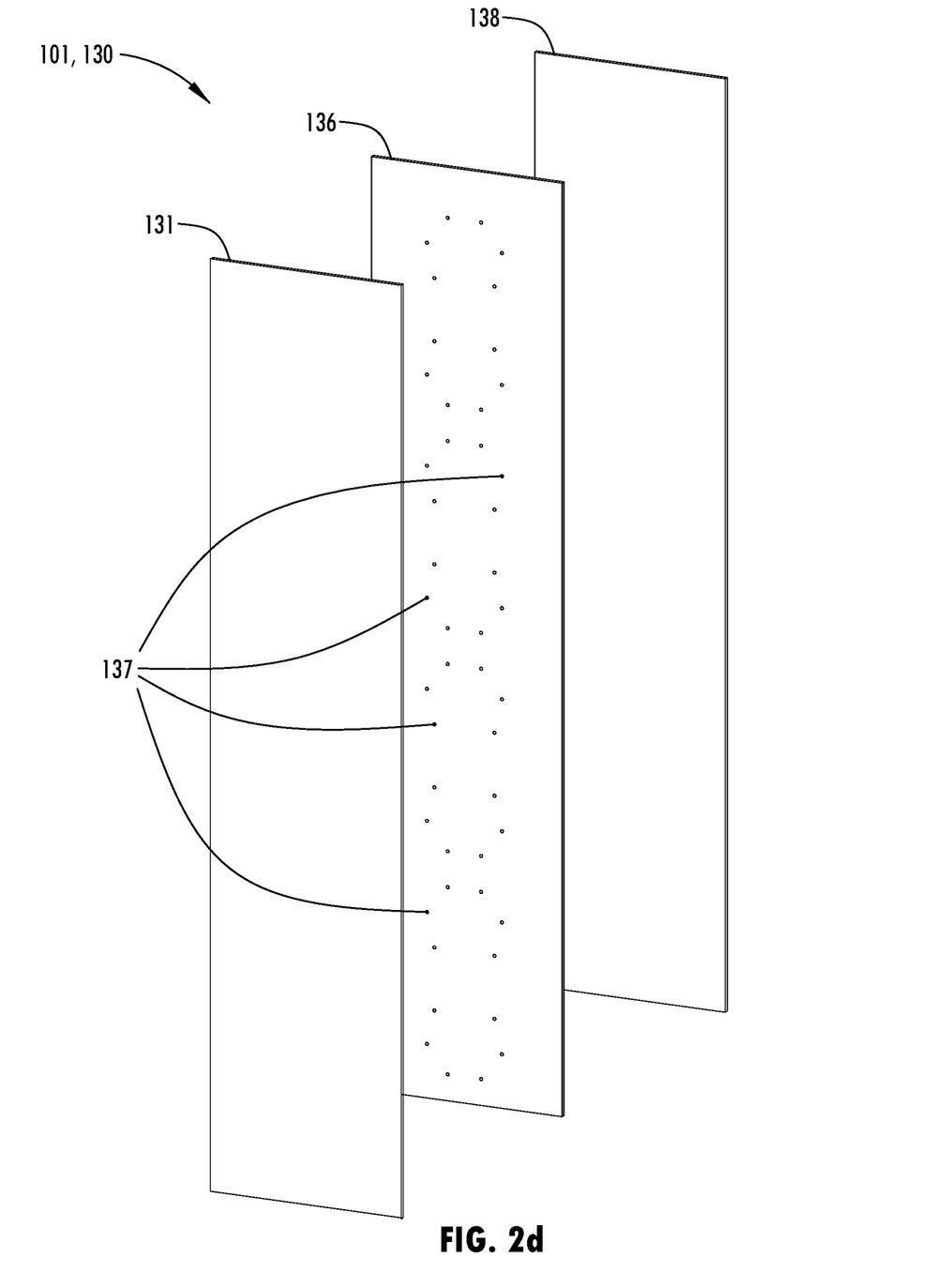
FIG. 2d is an exploded perspective view of a portion of an embodiment of an electrode of an electro-optic element.
Figure 2E:
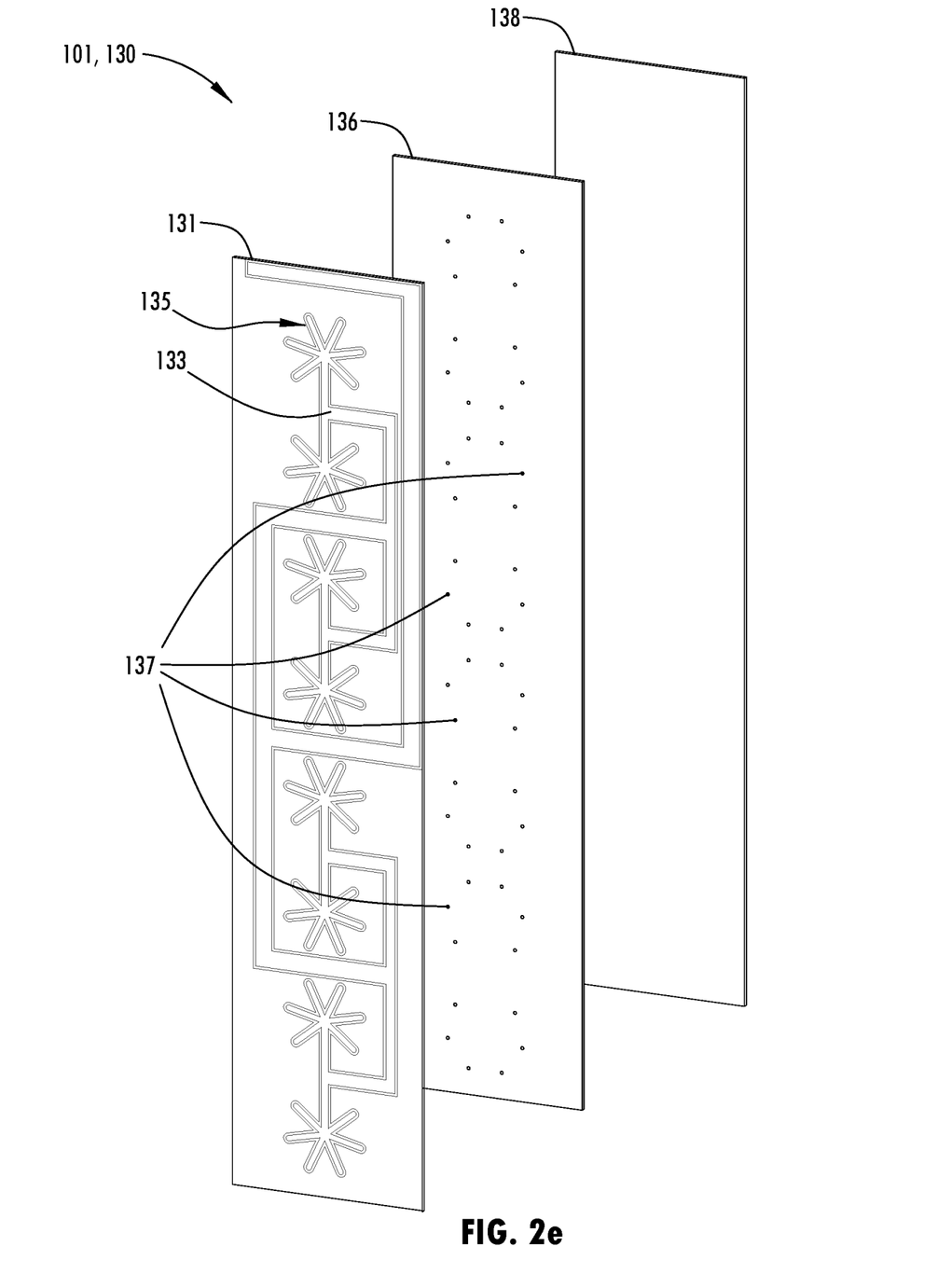
FIG. 2e is an exploded perspective view of a portion of an embodiment of an electrode of an electro-optic element.

Additionally, at least one of the electrodes 130 may have a layered construction. Accordingly, first electrode 130a and/or second electrode 130b may have layered constructions. As shown in FIGS. 2a-e the layered construction may comprise a first conductive layer 131, an insulating layer 136, and/or a second conductive layer 138. FIG. 2a illustrates a cross-sectional schematic view of an embodiment of an electrode 130. Additionally, FIG. 2b-c illustrate perspective views of alternative embodiments of electrode 130. Further, FIGS. 2d and 2e are exploded perspective views of a portion of electrode 130. Specifically, FIG. 2d illustrates the embodiment shown in FIG. 2b, and FIG. 2e illustrates the embodiment shown in FIG. 2c. In some embodiments, the portions of electrode 130 shown in FIGS. 2d and 2e correspond to one zone 101 of electro-optic element 101.

Figure 3A:
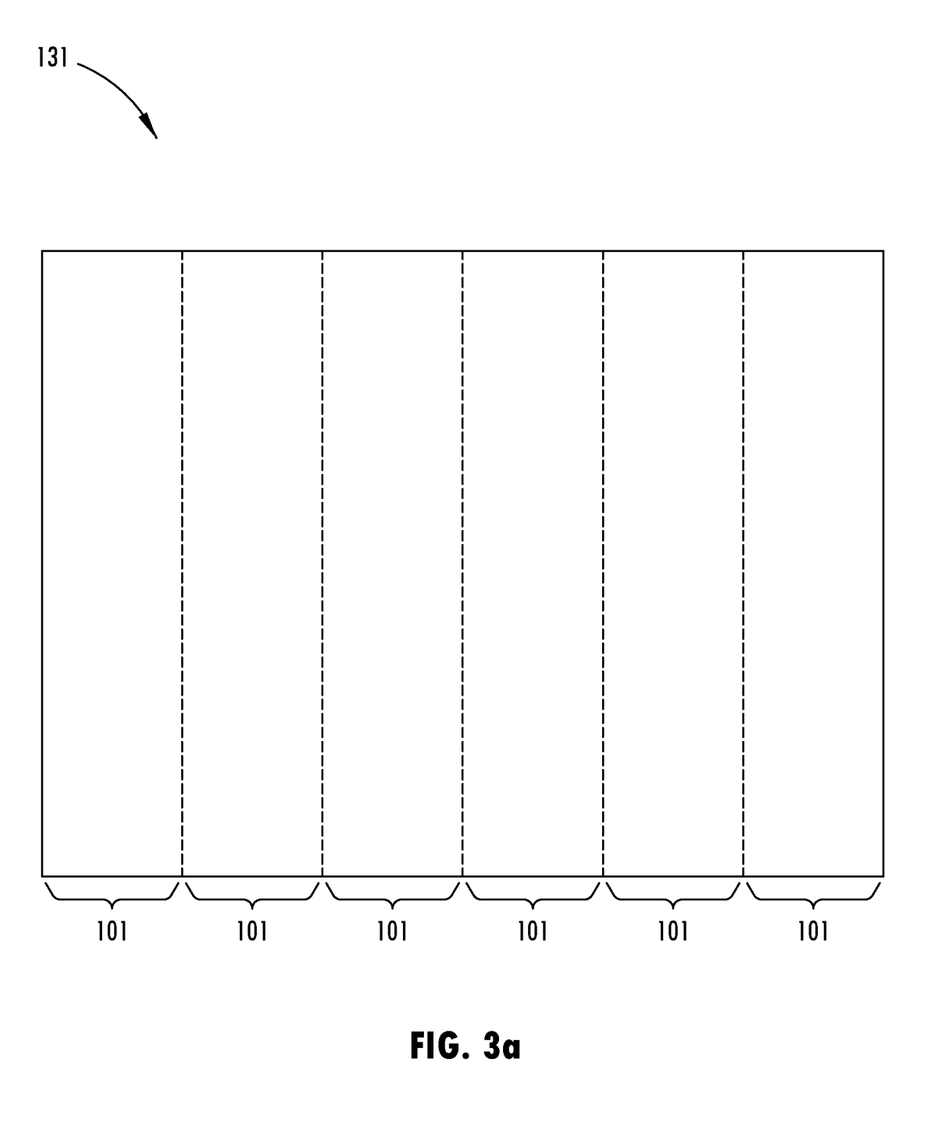
FIG. 3a is a schematic representation of an embodiment of a layer of an electrode of an electro-optic element.
Figure 3B:
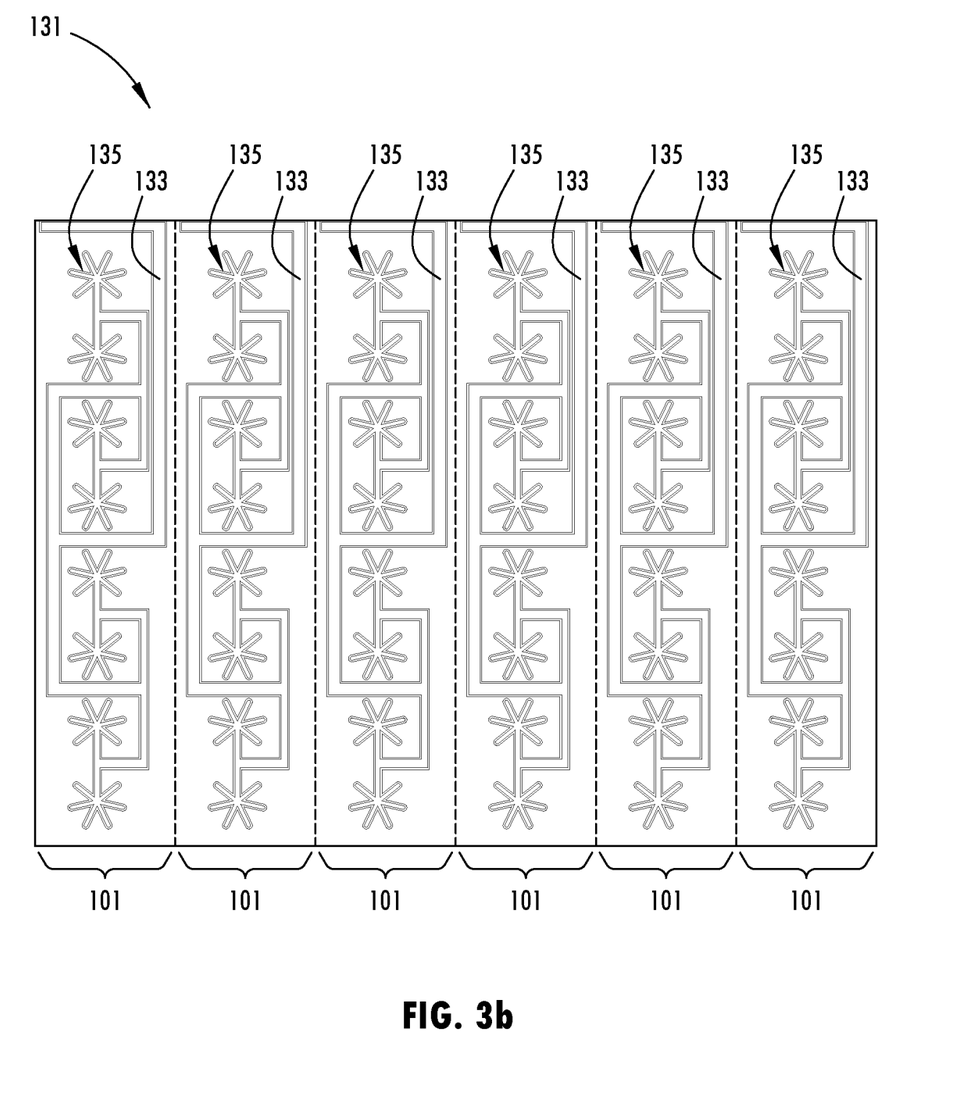
FIG. 3b is a schematic representation of an embodiment of a layer of an electrode of an electro-optic element.

First conductive layer 131, as additionally shown in isolation in FIGS. 3a-b, may be electrically conductive. In some embodiments, the first conductive layer 131 may have a high conductivity of greater than 1,000 S/cm. Additionally, first conductive layer 131 may be fabricated from a transparent conductive oxide (TCO), such as fluorine doped tin oxide (FTO), tin doped indium oxide (ITO), doped zinc oxide, indium zinc oxide, or other materials known in the art. In some embodiments, first conductive layer 131 may be in electrical communication with one or more electrical contact or bus. Accordingly, the electrical contact or bus may be operable to supply an electrical potential to first conductive layer 131. Moreover, first conductive layer 131 may be distributed across a plurality of points. The plurality of points may comprise any number of points. These points may merely be locations and not possess any physical features. In some embodiments, the points may be substantially uniformly distributed across an extent of electrode 130 and/or first conductive layer 131.

In some embodiments, as shown in FIG. 3a, which corresponds to the embodiment shown in FIGS. 2b and 2d, first conductive layer 131 may be substantially uniform thereacross. In other embodiments, as shown in FIG. 3b, which corresponds to the embodiment shown in FIGS. 2c and 2e, first conductive layer 131 may have an electrical distribution pattern. The electrical distribution pattern may be operable to distribute electrical current across first conductive layer 131 in accordance with the pattern. The pattern may be defined by one or more electrical pathways 133 in the first conductive layer 131. The electrical pathways 133 may be defined by one or more absence or removal of part of first conductive layer 131 within the plane of the layer, such as by an isolation line 134. The plane of the layer may be a plane substantially parallel to the second and/or third surfaces 112, 123.

In some such embodiments, the electrical pathways 133 may additionally be separated into a plurality of groups. Each group may correspond to a zone 101 of the electro-optic element 100. Further, each group may be electrically isolated one another such that electrical contacts or buses may be independently connected to each zone 101 such that the electrical potential supplied to each zone 101 may be independently controlled.

In some embodiments, the electrical pathways 133 may be distributed across first conductive layer 131 and/or a zone 101 in order to achieve a desired resistance from the electrical contact or bus to one of the plurality of points across first conductive layer 131 and/or a zone 101. Further, the resistance from the electrical contact or bus to the each of the points-either across either an entirety of first conductive layer 131 or an individual zone thereof—may be substantially equal. Thus, each of the points may be electrically connected to the electrical contact or bus via an electrical pathway 133 or a series of electrical pathways 133 connected to one another. Accordingly, in some embodiments, the electrical potential at each of the plurality of points may be substantially equal relative one another across an entirety of first conductive layer 131 or within an individual zone 131 thereof.

Figure 4A:
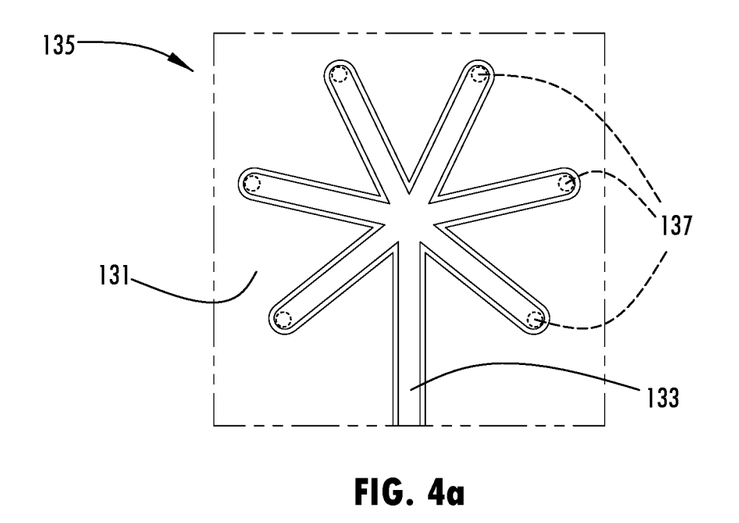
FIG. 4a is a schematic representation of an embodiment of an electrical pathway manifold.
Figure 4B:
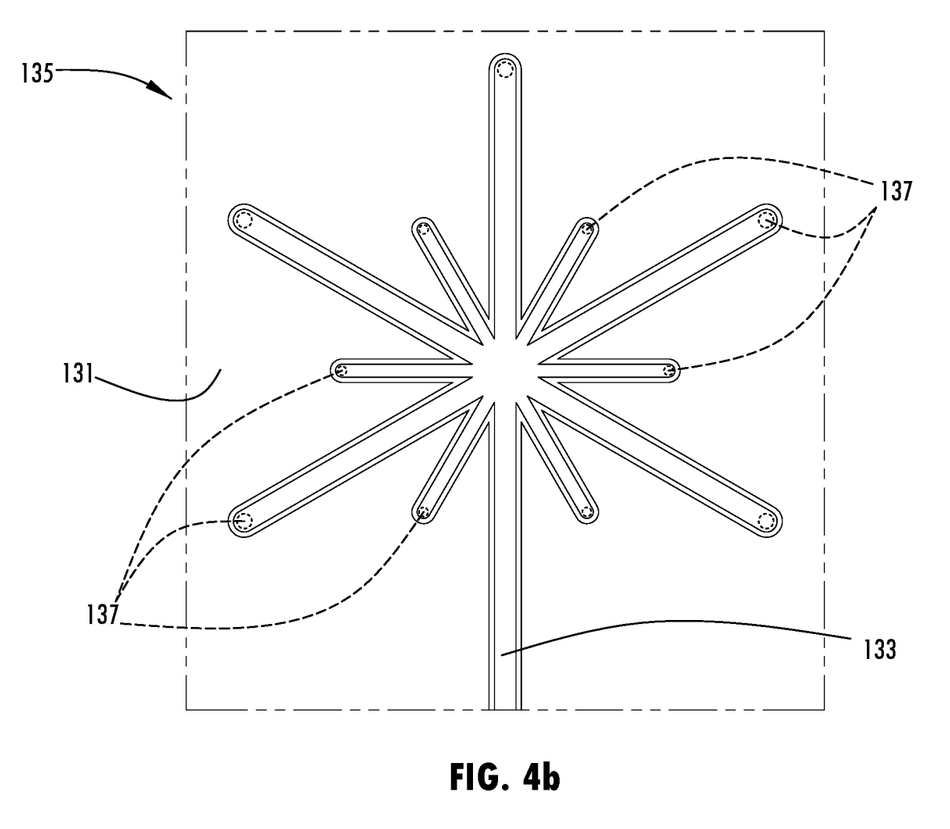
FIG. 4b is a schematic representation of an embodiment of an electrical pathway manifold.

In some such embodiments, to achieve substantially equal electrical potentials across the plurality of points, the electrical pathways 133 may form one or more manifolds 135, as illustrated in FIGS. 4a-b. As used herein, a "manifold" 135 may mean a collection of electrical pathways 133 forming branches from a common electrical pathway 133. In some embodiments, one or more manifold 135 may be arranged in a hub and spoke configuration. In some such embodiments, within a distal end of each of the spokes, may be one of the points. Additionally or alternatively, electrical pathways 133 may have varying widths relative one another. The width of an electrical pathway 133 may be defined as a minor extent thereof within a plane of the first conductive layer 131 and substantially parallel to planes of the second and/or third surfaces 112, 123. The widths may vary to change the resistance of the respective electrical pathway 133 such that a total resistance between each point of one or more of the points and an electrical contact or bus along the electrical pathway 133 or series of electrical pathways 133. Thus, the widths of one or more electrical pathways 133 may be selected to achieve substantially equal electrical potentials between the one or more points. In some embodiments, a shorter electrical pathway 133 may have a narrower width and a longer electrical pathway 133 may have a wider width. In some such embodiments, these electrical pathways 133 may be of a common manifold 135. Further, the width of each electrical pathway 133 may be varied proportional to the length of the branch or spoke of manifold 135 of which it forms, as shown in FIG. 4b.

Figure 5:
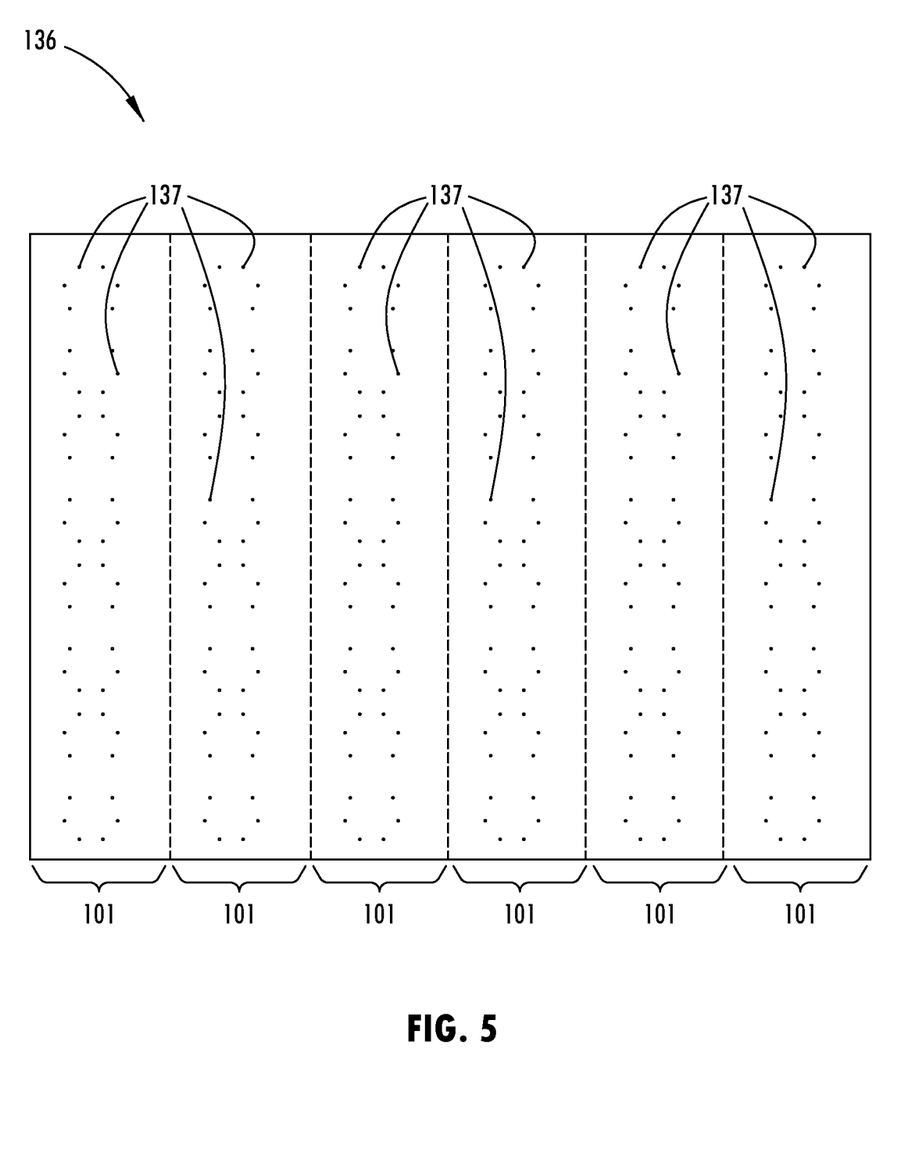
FIG. 5 is a schematic representation of an embodiment of a layer of an electrode of an electro-optic element.

Insulating layer 136, may be disposed between first conductive layer 131 and electro-optic medium 160. Further, insulating layer 136 may be in abutting contact with first conductive layer 131. In some embodiments, insulating layer 136 may be characterized as having a relatively low conductivity. Accordingly, insulating layer 136 may have a conductivity of less than 1000 S/cm. In some embodiments, insulating layer 136 may comprise multiple sub-layers of dielectric materials. Additionally or alternatively, insulating layer 136 may be characterized as having a resistivity of 10 or 100 or more times greater than the resistivity of first conductive layer 131. In some embodiments, insulating layer 136 may be substantially transparent in the visible and/or infra-red regions of the electromagnetic spectrum. Additionally, as shown in FIG. 5, insulating layer may comprise one or more holes 137. Each hole 137 may correspond to and be aligned with one of the one or more points of the first conductive layer 131. Specifically, they may be aligned in a direction substantially perpendicular to the first, second, third and/or fourth surfaces 111, 112, 123, 124. In some embodiments, one or more of the holes 137 of insulating layer 136 may be filled with an electrically conductive material.

In some embodiments, the shape and/or size of each hole 137 may be selected. Further, the shapes and/or sizes of each hole 137 may be varied across insulating layer 136 in order to enhance or reduce electrical resistance therethrough and thus increase the uniformity of the electrical potential between the locations of holes 137. Such a construction may be particularly beneficial to embodiments where first conductive layer 131 is substantially uniform thereacross.

Figure 6:
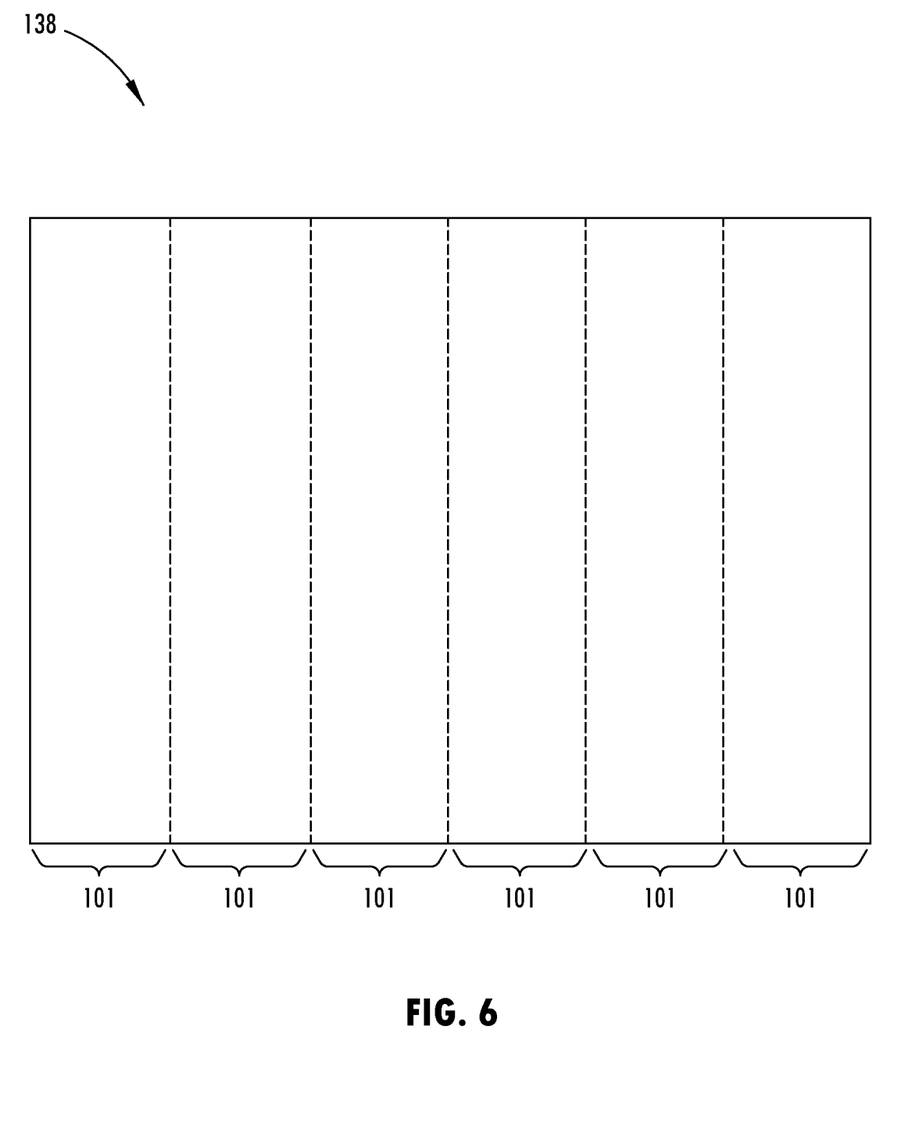
FIG. 6 is a schematic representation of an embodiment of a layer of an electrode of an electro-optic element.

Second conductive layer 138, as shown in FIG. 6, may be disposed between electro-optic medium 160 and insulating layer 136. Thus, second layer 138 may also be disposed between first conductive layer 131 and electro-optic medium 160. Accordingly, insulating layer 136 may be disposed between first conductive layer 131 and second conductive layer 138. Further, second conductive layer 138 may be in abutting contact with insulating layer 136. Moreover, second conductive layer 138 may be in electrical communication with first conductive layer 131 via the one or more holes 137 of insulating layer 136. In some embodiments, second conductive layer 138 may have a high conductivity of greater than 1,000 S/cm. Additionally, second conductive layer 138 may be fabricated from a transparent conductive oxide (TCO), such as fluorine doped tin oxide (FTO), tin doped indium oxide (ITO), doped zinc oxide, indium zinc oxide, or other materials known in the art. Furthermore, second conductive layer 138 may be substantially uniform thereacross.

In embodiments where one of the electrodes does not have a layered construction, those electrodes 130 may be fabricated from a transparent conductive oxide (TCO), such as fluorine doped tin oxide (FTO), tin doped indium oxide (ITO), doped zinc oxide, indium zinc oxide, or other materials known in the art.

Seal 140 may be disposed in a peripheral manner to, at least in part, define a chamber 150. Chamber 150 is disposed between first substrate 110 and second substrate 120. Accordingly, chamber 150 may be defined by seal 140 in conjunction with at least two of: first substrate 110, second substrate 120, first electrode 130*a*, and second electrode 130*b*. In some embodiments, chamber 150 may, more specifically, be defined by seal 140, first electrode 130*a*, and second electrode 130*b*. Seal 140 may comprise any material capable of being bonded to the at least two of: first substrate 110, second substrate 120, first electrode 130*a*, and second electrode 130*b*, to in turn inhibit oxygen and/or moisture from entering chamber 150, as well as inhibit electro-optic medium 160 from inadvertently leaking out. Seal 140, for example, may include epoxies, urethanes, cyanoacrylates, acrylics, polyimides, polyamides, polysulfides, phenoxy resin, polyolefins, and silicones.

Electro-optic medium 160 may be disposed in chamber 150. Thus, electro-optic medium 160 may be disposed between the electrodes 130. Further, electro-optic medium 160 may be operable between substantially activated and un-activated states based, at least in part, on exposure to a particular electrical potential. Accordingly, electro-optic medium 160 may be an electrochromic medium, a polymer dispersed liquid crystal (PDLC) medium, twisted nematic liquid crystal medium, or suspended particle liquid crystal medium. In embodiments where electro-optic medium 160 is electrochromic, in an activated state, electro-optic medium 160 may be operable to exhibit a change, relative an un-activated state, in its extinction coefficient at one or more wavelengths in the electromagnetic spectrum. In some such embodiments, this change may occur in the visible region of the electromagnetic spectrum.

In operation, an electrical potential may be applied to the electrodes 130. Specifically, the electrical potential may be applied to the electrodes 130 via the electrical contact and/or bus. Further, an electrical current may be conducted across first conductive layer 131 to the one or more points. Additionally, this electrical current may be conducted through the one or more holes 137 in insulating layer 136 to second conductive layer 138. In turn, second conductive layer 138 may laterally distribute the electrical current and thereby apply an electrical potential to electro-optic medium 160 for activation. Such electro-optic elements 100 may have the advantage of the electrical potential being applied by the electrode 130 may have increased uniformity thereacross.

In embodiments where the shapes and/or sizes of each hole 137 are varied across insulating layer 136, the resistance of the electrical conductivity therethrough may be selected to compensate for potential dop across first conductive layer 131. This compensation may achieve the increased uniformity advantage.

In embodiments where first conductive layer 131 has an electrical distribution pattern, the electrical current may be conducted to the one or more points via the one or more electrical pathways 133. Such a construction may be advantageous over embodiments where first conductive layer 131 is substantially uniform thereacross, because using only the shape and size of holes 137 to accurate control of resistance and thus to achieve increased potential uniformity may be challenging. The use of the electrical pathways 133 may allow for a more accurate, easily constructed, and cost-efficient increase in electrical potential uniformity through holes 137. Further, the electrical pathways 133 may be electrically separated into a plurality of groups. By separating the electrical pathways 133 into electrically isolated groups, the electrical potential applied to each group may independently be controlled allowing for the electrical potential within respective zones 101 to be independently controlled. Therefore, a segmented operation of the electro-optic element 100 may be achieved where the electro-active medium 160 is selectively activated to different extents in different zones 101.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first," "second," and the like, are used solely to distinguish one entity or action from another entity or action, without necessarily requiring or implying any actual such relationship or order between such entities or actions.

For purposes of this disclosure, the term "associated" generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The term "transparent" is applied in the relative sense. "Transparent" refers to an optical element or material that is substantially transmissive of at wavelengths in question and thus generally allows light at such wavelengths to pass therethrough. The wavelengths in question will vary based on the context. However, in the event the wavelengths in question is not readily apparent, the wavelengths in question shall generally refer to visible light.

The term "transflective" generally refers to an optical configuration that reflects at least a portion of light incident from at least one side and transmits at least a portion of light incident from at least one side. In particular, "transflective" describes an optical element or component that has a non-zero level of transmittance with regard to a wave range of light and also has a non-zero level of reflectance in a region. The applicable wave range of light will vary based on the context. However, in the event the relevant wave range of light is not readily apparent, the wave range in light shall generally refer to visible light.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A device comprising:
   a first substate having a first surface and a second surface;
   a second substrate having a third surface and a fourth surface, the second substrate disposed in a substantially parallel and spaced apart relationship relative the first substate;
   a first electrode associated with the second surface;
   a second electrode associated with the third surface; and
   an electro-optic medium disposed between the first and second electrodes;
   wherein at least one of the first and second electrodes comprises:
   a first conductive layer in electrical communication with at least one of an electrical contact and a bus, the first conductive layer distributed across a plurality of points;
   a second conductive layer disposed between the first conductive layer and the electro-optic medium; and
   an insulating layer disposed between the first and second conductive layers and spaced from the first and second substrates, the insulating layer patterned with a plurality of holes aligned with the plurality of points operable to allow electrical communication between the first and second conductive layers.

2. The device of claim 1, wherein the points are distributed substantially uniformly across an extent of the first conductive layer.

3. The device of claim 1, wherein the first conductive layer is substantially uniform thereacross.

4. The device of claim 1, wherein resistance along the electrical pathways between the at least one of an electrical contact and a bus and each of the points is substantially equal.

5. The device of claim 1, wherein the one or more electrical pathways are separated into a plurality of electrically isolated groups corresponding to a plurality of zones of the device such that the electro-optic medium may substantially selectively vary an activation of the electro-optic medium within each zone.

6. The device of claim 5, wherein for each group, resistance along the electrical pathways between the at least one of the electrical contact and the bus and each of the points within the corresponding zone is substantially equal.

7. The device of claim 1, wherein the electrical pathways have varying widths relative one another to change the resistance of the electrical pathways relative one another.

8. The device of claim 1, wherein the width of the electrical pathways forming the spokes of the manifold are proportional to the length thereof and at least two of the plurality of spokes have different lengths.

9. The device of claim 1, wherein the insulating layer comprises multiple sub-layers of dielectric materials.

10. The device of claim 1, wherein the insulating layer has a resistivity at least 10 times greater than the resistivity of the first conductive layer.

11. The device of claim 10, wherein the insulating layer has a resistivity at least 100 times greater than the resistivity of the first conductive layer.

12. The device of claim 1, wherein the holes are filled with an electrically conductive material.

13. The device of claim 1, wherein at least one of a shape and a size of the holes is varied to change an electrical resistance therethrough, increasing uniformity between electrical potentials at the locations of the holes.

14. The device of claim 1, wherein the electrical potentials at the points are substantially equal.

15. The device of claim 1, wherein the second conductive layer is substantially uniform.

16. The device of claim 8, wherein the plurality of spokes include longer spokes spaced by shorter spokes, the width of the electrical pathways forming the shorter spokes being smaller than the longer spokes.

17. The device of claim 1, wherein the electrical distribution pattern includes individually addressable zones of electrically isolated groups to selectively activate regions of the electro-active medium.

\* \* \* \* \*